(12) United States Patent
Kai et al.

(10) Patent No.: US 9,077,470 B2
(45) Date of Patent: Jul. 7, 2015

(54) OPTICAL TRANSMISSION SYSTEM USING CROSS PHASE MODULATION

(71) Applicant: FUJITSU LIMITED, Kawasaki-shi, Kanagawa (JP)

(72) Inventors: Yutaka Kai, Kawasaki (JP); Shigeki Watanabe, Kawasaki (JP); Ryou Okabe, Shinagawa (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 13/767,077

(22) Filed: Feb. 14, 2013

(65) Prior Publication Data

US 2013/0266320 A1 Oct. 10, 2013

(30) Foreign Application Priority Data

Apr. 6, 2012 (JP) ................................. 2012-087975

(51) Int. Cl.
 *H04J 14/02* (2006.01)
 *H04J 14/00* (2006.01)

(52) U.S. Cl.
 CPC ................. *H04J 14/00* (2013.01); *H04J 14/02* (2013.01); *H04J 14/0256* (2013.01); *H04J 14/0298* (2013.01)

(58) Field of Classification Search
 CPC ....... H04J 14/00; H04J 14/02; H04J 14/0256; H04J 14/0298
 USPC ........... 398/68, 69, 76, 79, 82, 141, 151, 162, 398/163, 167
 See application file for complete search history.

(56) References Cited

U.S. PATENT DOCUMENTS

| | | | | |
|---|---|---|---|---|
| 4,783,779 A | * | 11/1988 | Takahata et al. | 370/344 |
| 4,953,156 A | | 8/1990 | Olshansky et al. | |
| 5,058,102 A | * | 10/1991 | Heidemann | 398/72 |
| 5,134,509 A | * | 7/1992 | Olshansky et al. | 398/76 |
| 5,896,211 A | * | 4/1999 | Watanabe | 398/76 |

(Continued)

FOREIGN PATENT DOCUMENTS

| | | |
|---|---|---|
| JP | 2011-215603 | 10/2011 |
| WO | WO 02/061981 A2 | 8/2002 |

OTHER PUBLICATIONS

British Search Report issued Aug. 9, 2013 in corresponding British Application No. GB1302486.4.

*Primary Examiner* — Ken Vanderpuye
*Assistant Examiner* — Amritbir Sandhu
(74) *Attorney, Agent, or Firm* — Staas & Halsey LLP

(57) ABSTRACT

An optical transmission system includes: multiplex transmitting devices, each configured to modulate, with an optical carrier, a data signal modulated into light by an optical modulator in a non-linear optical medium arranged on a transmission path so as to multiplex the data signal into the optical carrier, the data signal having a frequency different in each of the multiplex transmitting devices; a receiving device configured to execute optical-to-electrical conversion on the optical carrier received from the transmission path so as to execute reception process of the data signals multiplexed by the multiplex transmitting devices; and a management device configured to specify a frequency band to be used, based on a modulation band of each of the optical modulators, and manage assignment of the frequency of each of the data signals within the frequency band to be used so as to avoid an effect of harmonics generated upon the optical-to-electrical conversion.

10 Claims, 14 Drawing Sheets

(56) References Cited

U.S. PATENT DOCUMENTS

| | | | |
|---|---|---|---|
| 5,956,642 A * | 9/1999 | Larsson et al. | 455/449 |
| 6,031,645 A * | 2/2000 | Ichikawa | 398/41 |
| 2006/0222365 A1* | 10/2006 | Jung et al. | 398/72 |
| 2008/0243518 A1* | 10/2008 | Oraevsky et al. | 704/500 |
| 2009/0080889 A1* | 3/2009 | Nozue et al. | 398/69 |
| 2009/0239482 A1* | 9/2009 | Akita et al. | 455/77 |
| 2010/0158527 A1* | 6/2010 | Mizutani et al. | 398/78 |
| 2011/0091220 A1* | 4/2011 | Rajagopal et al. | 398/172 |
| 2011/0229138 A1* | 9/2011 | Watanabe | 398/79 |
| 2012/0093509 A1* | 4/2012 | Kazawa et al. | 398/58 |
| 2012/0213518 A1* | 8/2012 | Tamai et al. | 398/58 |
| 2013/0095760 A1* | 4/2013 | Thota et al. | 455/41.2 |
| 2013/0266320 A1* | 10/2013 | Kai et al. | 398/79 |
| 2013/0272709 A1* | 10/2013 | Watanabe et al. | 398/74 |
| 2014/0064732 A1* | 3/2014 | Kai et al. | 398/76 |
| 2014/0147119 A1* | 5/2014 | Watanabe et al. | 398/76 |

* cited by examiner

FIG. 8

| MANAGEMENT NUMBER | NODE ID | BANDWIDTH (MHz) | OCCUPIED BANDWIDTH (MHz) | CENTRAL FREQUENCY (MHz) | USAGE STATE |
|---|---|---|---|---|---|
| 1 | A-2 | 100 | 200 | 5900 | CURRENTLY USED |
| 2 | – | 150 | 300 | 6150 | UNUSED |
| 3 | A-1 | 50 | 100 | 6350 | CURRENTLY USED |
| 4 | – | 100 | 200 | 6500 | UNUSED |
| 5 | B-2 | 150 | 300 | 6750 | CURRENTLY USED |

OPTICAL TRANSMISSION SYSTEM USING CROSS PHASE MODULATION

CROSS-REFERENCE TO RELATED APPLICATION

This application is based upon and claims the benefit of priority of the prior Japanese Patent Application No. 2012-087975, filed on Apr. 6, 2012, the entire contents of which are incorporated herein by reference.

FIELD

The embodiments discussed herein are related to an optical transmission system.

BACKGROUND

Optical frequency division multiplexing (optical FDM) is known (refer to Japanese Laid-open Patent Publication No. 2011-215603), which enables a plurality of transmitting devices to convert electric signals into optical signals with different frequencies, multiplex the optical signals into an optical carrier, and transmit the optical carrier to a receiving device. This technique is used to cause cross phase modulation (XPM) between the optical carrier with a single frequency and the modulated optical signals having the frequencies and generated by the multiplex transmitting devices and transmit the plurality of data signals multiplexed into the optical carrier to the receiving device.

The receiving device receives the optical carrier and converts the received optical carrier into an electric signal. After that, the receiving device uses an electric filter to extract the data signals. Unlike the case where the data signals are extracted from the optical signals before the conversion, high-accuracy wavelength control is not executed between the multiplex transmitting devices and not executed by a wavelength separator. Thus, the receiving device may easily extract the plurality of densely multiplexed data signals. Optical FDM enables multiple types of data signals (such as video information, audio information, sensor information and wireless communication information) input to the plurality of multiplex transmitting devices to be transmitted through a single transmission path to the receiving device and enables the data signals to be extracted by the receiving device.

SUMMARY

According to an aspect of the invention, an optical transmission system includes: a plurality of multiplex transmitting devices, each configured to modulate, with an optical carrier, a data signal modulated into light by an optical modulator in a non-linear optical medium arranged on a transmission path through which the optical carrier is transmitted so as to multiplex the data signal into the optical carrier, the data signal having a frequency different in each of the plurality of multiplex transmitting devices; a receiving device configured to execute optical-to-electrical conversion on the optical carrier received from the transmission path so as to execute reception process of the data signals multiplexed by the plurality of multiplex transmitting devices; and a management device configured to specify a frequency band to be used, based on a modulation band of each of the optical modulators, and manage assignment of the frequency of each of the data signals within the frequency band to be used so as to avoid an effect of harmonics generated upon the optical-to-electrical conversion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a management table;

DESCRIPTION OF EMBODIMENTS

An optical transmission system that is based on the aforementioned optical FDM uses cross phase modulation that occurs in a broadband non-linear optical medium. Thus, the optical transmission system may ensure a wide frequency band of a terahertz (THz) level. The number of data signals to be multiplexed, however, is limited on the basis of an upper limit for a frequency band to be used for modulation and bandwidths occupied by the data signals. Thus, even if a wide frequency band is available, frequencies to be assigned to the data signals are limited. An optical transmission system that efficiency uses a frequency band will be described below.

First Embodiment

Figure 1:
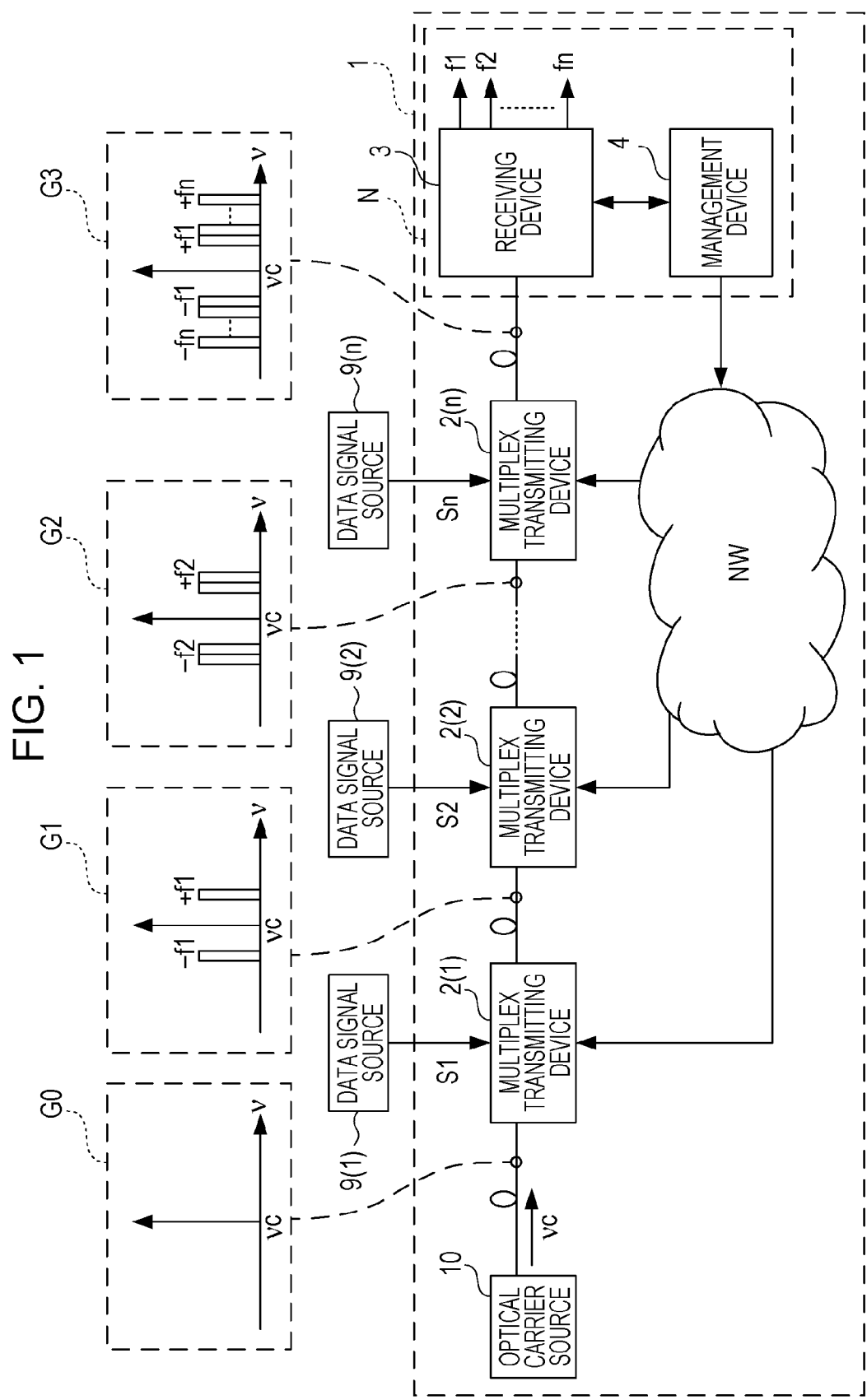
FIG. 1 is a diagram illustrating the configuration of an optical transmission system according to the first embodiment.

FIG. 1 is a diagram illustrating the configuration of an optical transmission system 1 according to the first embodiment. The optical transmission system 1 includes an optical carrier source 10, a plurality of multiplex transmitting devices 2(1) to 2(n) and a receiving node N. The receiving node N includes a receiving device 3 and a management device 4. The optical carrier source 10 and the plurality of multiplex transmitting devices 2(1) to 2(n) are connected to each other by optical fibers that form a common transmission path. The management device 4 is connected to the multiplex transmitting devices 2(1) to 2(n) through a communication network NW that is different from the transmission path formed by the optical fibers.

The multiplex transmitting devices 2(1) to 2(n) receive data signals S1 to Sn from external data signal sources 9(1) to 9(n), respectively. The data signals S1 to Sn may be, but are not limited to, Ethernet (registered trademark) data signals, signals detected by sensor devices, or the like.

The optical transmission system 1 multiplexes the data signals S1 to Sn modulated by the multiplex transmitting devices 2(1) to 2(n) and thereby having frequencies f1 to fn into an optical carrier vc (refer to graphs G0 to G3) output from the optical carrier source 10 in accordance with optical frequency division multiplexing (optical FDM). The data signals S1 to Sn are extracted and received by the receiving device 3 for frequency components f1 to fn.

Figure 2:
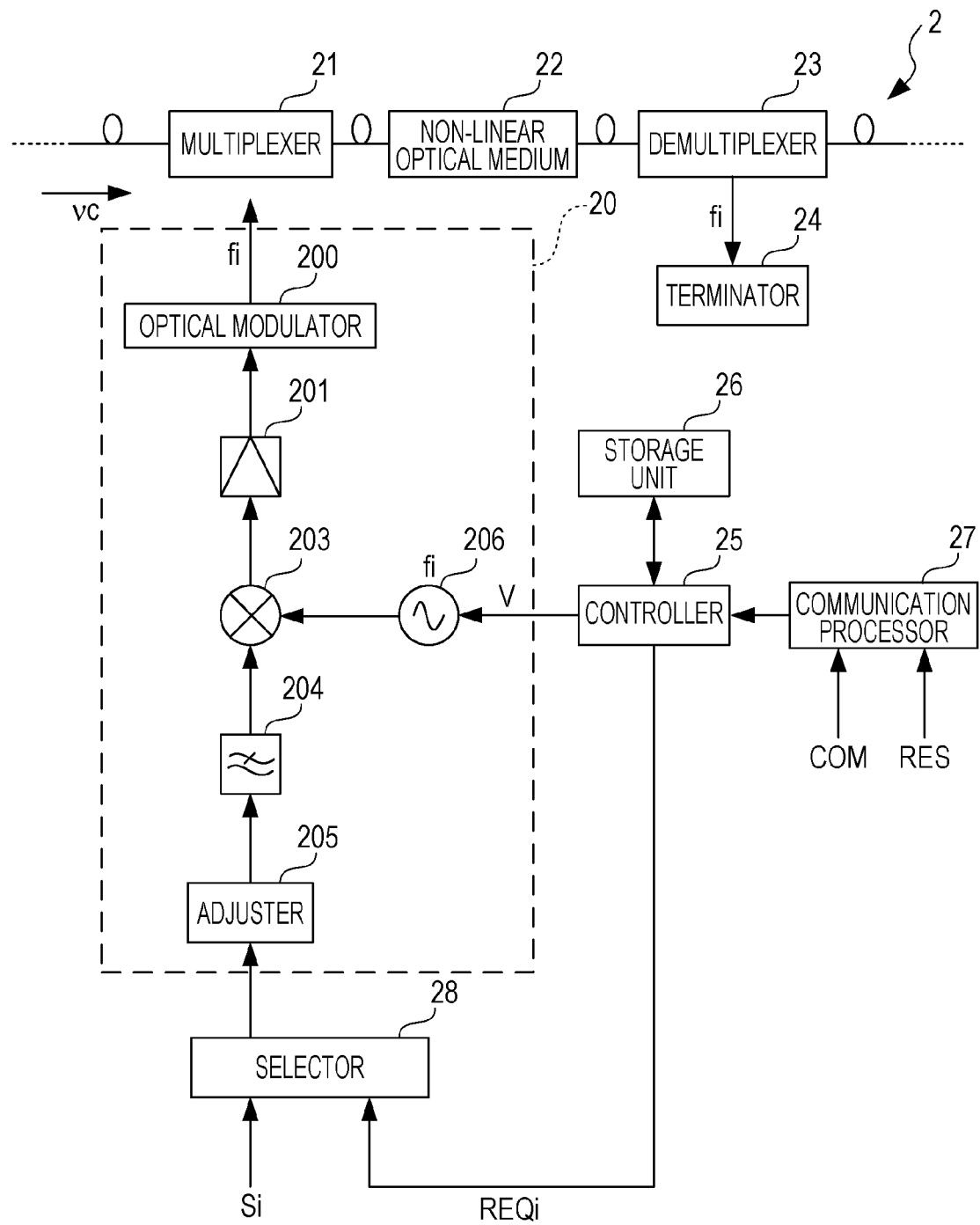
FIG. 2 is a diagram illustrating the configuration of a multiplex transmitting device according to the first embodiment.

FIG. 2 is a diagram illustrating the configuration of each of the multiplex transmitting devices 2(1) to 2(n). Each of the multiplex transmitting devices 2(1) to 2(n) includes a modulated signal generator 20, a multiplexer 21, a non-linear optical medium 22, a demultiplexer 23, a terminator 24, a controller 25, a storage unit 26, a communication processor 27 and a selector 28.

A data signal Si is output from a data signal source 9(i) (i=1 to n, the same applies the following description) and input to the modulated signal generator 20 through the selector 28. When the selector 28 receives a request signal (control signal) REQi from the controller 25, the selector 28 prioritizes the request signal REQi over the data signal Si and outputs the request signal REQi to the modulated signal generator 20. Specifically, the selector 28 selects any of the request signal REQi and the data signal Si and outputs the selected signal to the modulated signal generator 20. The request signal REQi is a signal that requests the management device 4 to assign a frequency.

The modulated signal generator 20 includes an optical modulator 200, an amplifier 201, a multiplier 203, a low-pass filter 204, an adjuster 205 and an oscillator 206. The adjuster 205 adjusts the amplitude of the output data signal Si, the amplitude of the request signal REQi and a bias voltage. The low-pass filter 204 is, for example, an RC circuit and removes a high-frequency component from the output data signal Si and the control signal REQi.

The multiplier 203 is, for example, a mixer circuit and modulates the data signal Si or the request signal REQi on the basis of a signal received from the oscillator 206 and having a frequency fi. The oscillator 206 is a voltage controlled oscillator (VCO), for example. The controller 25 sets a control voltage V of the oscillator 206 and thereby controls the frequency fi of the oscillator 206.

The controller 25 is, for example, a processing circuit such as a central processing unit (CPU) and executes a process on the basis of a predetermined program. The controller 25 may not function using the software. The controller 25 may function using hardware such as an integrated circuit for specific use.

The storage unit 26 is a storage section such as a memory or the like. The storage unit 26 stores a program to be used to operate the controller 25 and the like.

The controller 25 communicates with an external device through the communication processor 27 that executes a communication process. The controller 25 operates in accordance with a command signal COM received from an operating terminal (not illustrated) or a signal RES received from the management device 4. The signal RES is a response signal to the request signal REQi. For example, when the data signal Si is to be newly multiplexed, the controller 25 transmits, to the management device 4 on the basis of the command signal COM, the request signal REQi that requests the management device 4 to assign a frequency fi. In this case, since the controller 25 transmits the request signal REQi, the controller 25 supplies, to the oscillator 206, a voltage corresponding to a fixed frequency f0.

The request signal REQi includes information of a bandwidth BWi based on the transmission rate (i.e., bit rate) of the data signal Si. The management device 4 assigns the frequency fi to the data signal Si on the basis of the request signal REQi and transmits the response signal RES that includes information of the frequency fi to the multiplex transmitting device 2(i) through the communication network NW. Then, the controller 25 applies, to the oscillator 206, a voltage V corresponding to the frequency fi indicated by the response signal RES and thereby sets the frequency fi assigned to the data signal Si. The response signal RES includes destination information that specifies the multiplex transmitting device 2(i) that is a destination of the response signal RES. Thus, the multiplex transmitting device 2(i) references the destination information and processes only the response signal RES of which the destination is the multiplex transmitting device 2(i).

The amplifier 201 amplifies the modulated data signal Si or the modulated request signal REQi and outputs the amplified modulated signal to the optical modulator 200. The optical modulator 200 is a laser diode (LD), for example. The optical modulator 200 converts the modulated signal into an optical signal and outputs the optical signal to the multiplexer 21. The optical modulator 200 may not be the LD that executes direct modulation. The optical modulator 200 may be a Mach-Zehnder modulator or lithium niobate (LN) modulator that executes external modulation. In this case, an optical source (LD or the like) that outputs light to the optical modulator 200 is arranged.

The multiplexer 21 is, for example, an optical coupler and connected to the transmission path through which the optical carrier vc is transmitted. The optical signal with the frequency fi and the optical carrier vc are input to the non-linear optical medium 22. Cross phase modulation occurs between the optical signal with the frequency fi and the optical carrier vc in the non-linear optical medium 22, and whereby the data signal Si or the request signal REQi is multiplexed into the optical carrier vc.

Examples of the optical intermodulation by the non-linear optical medium 22 are optical phase modulation by the cross phase modulation and optical intensity modulation by an optical parametric effect. As the non-linear optical medium 22, an optical fiber, periodically poled lithium niobate, a semiconductor optical amplifier or a high index contrast optical waveguide such as a silicon wire waveguide may be used.

For the optical fiber, a high nonlinear optical fiber or an optical fiber or waveguide in which germanium is doped in a core or bismuth is doped in order to increase a non-linear refractive index is used. In addition, for the optical fiber, a fiber or waveguide that has an optical power density increased by reducing a mode field, a fiber or waveguide that uses chalcogenide, or a photonic crystal fiber or waveguide may be used.

Other examples of the non-linear optical medium 22 are a semiconductor optical amplifier with a quantum well structure, a quantum-dot semiconductor optical amplifier, a silicon photonic waveguide and a device that produces a second-order non-linear optical effect such as three-wave mixing. If this device is used, a $LiNbO_3$ waveguide with a quasi phase matching structure, a GaAlAs element, second-order nonlinear optical crystal or the like may be used.

After the cross phase modulation occurs between the optical signal with the frequency fi and the optical carrier vc in the non-linear optical medium 22, the optical signal with the frequency fi may be demultiplexed by the demultiplexer 23 connected to the non-linear optical medium 22 and be terminated by the terminator 24. In this case, since the optical signal with the frequency fi is removed from the transmission path for the optical carrier vc, an effect on a multiplexing process to be executed by an adjacent multiplex transmitting device 2($i$+1) is reduced. The demultiplexer 23 is a wavelength division multiplexing (WDM) coupler, for example.

The plurality of multiplex transmitting devices 2(1) to 2($n$) cause the optical modulators 200 to modulate the data signals S1 to S2 with the different frequencies f1 to fn. Then, the plurality of multiplex transmitting devices 2(1) to 2($n$) cause the modulated data signals S1 to S2 to be input to the non-linear optical media 22 arranged on the transmission path for the optical carrier vc. The plurality of multiplex transmitting devices 2(1) to 2($n$) multiplex the data signals S1 to Sn into the optical carrier vc. The data signals Si to be multiplexed by the multiplex transmitting devices 2($i$) are not limited to the signals that each have a single frequency. Each of the data signals Si may be a multiple signal that includes a plurality of data signals with different frequencies.

Figure 3:
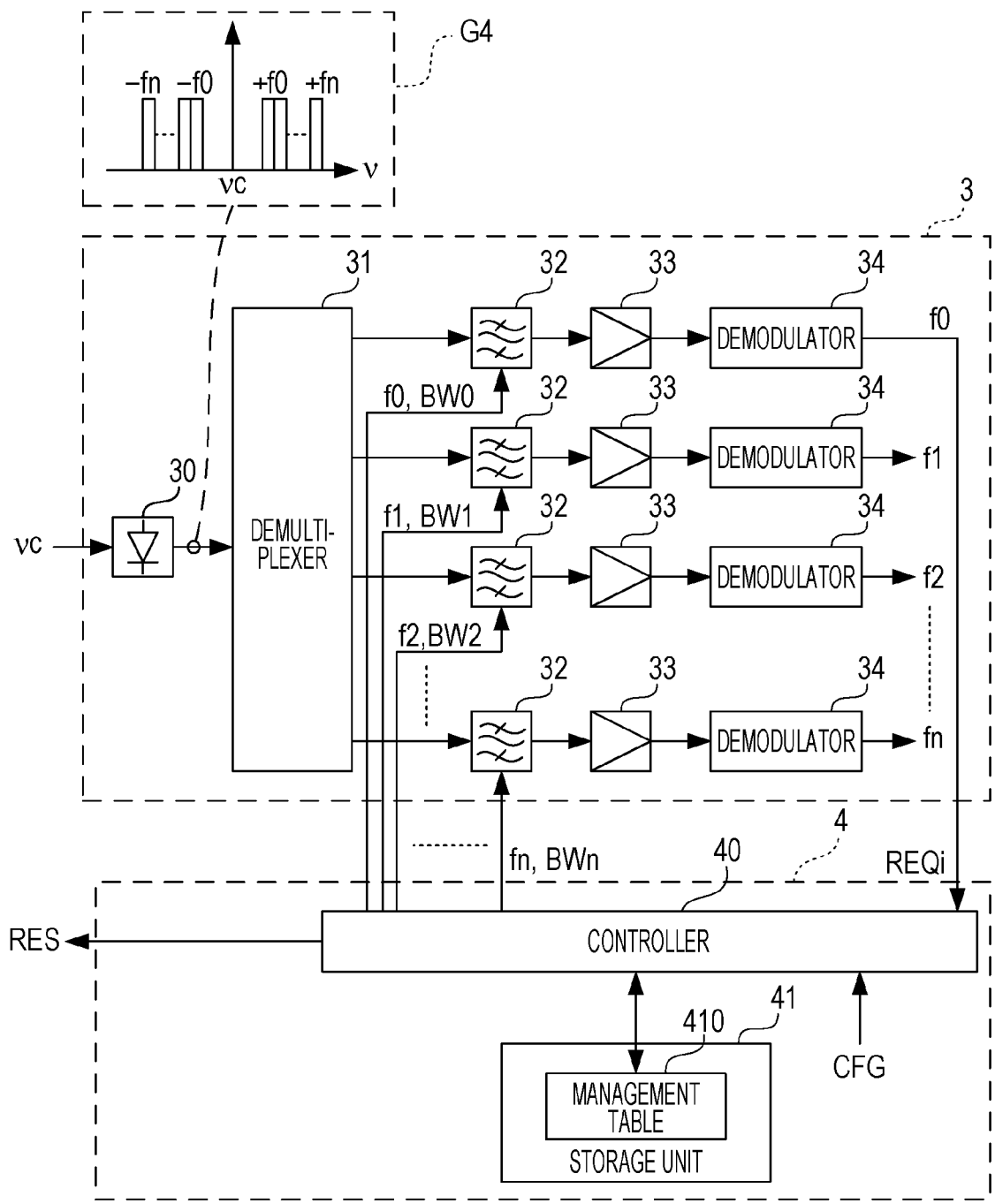
FIG. 3 is a diagram illustrating the configuration of a receiving node according to the first embodiment.

FIG. 3 is a diagram illustrating the configuration of the receiving node N according to the first embodiment. The receiving device 3 has a photodiode (PD) 30, a demultiplexer 31, and a plurality of groups of tunable band-pass filters 32, amplifiers 33 and demodulators 34. The management device 4 includes a controller 40 and a storage unit 41.

First, the receiving device 3 is described below. The PD 30 executes optical-to-electrical (OE) conversion on the optical carrier vc so as to generate an electric signal and outputs the electric signal to the demultiplexer 31. The demultiplexer 31 outputs the electric signal to the tunable band-pass filters 32 while maintaining impedance of the electric signal at a substantially even level.

The tunable band-pass filters 32 cause electric signals with central frequencies f0 to fn set by the controller 40 and electric signals with bandwidths BWi to pass through the tunable band-pass filters 32. The amplifiers 33 amplify the electric signals that have passed through the tunable band-pass filters 32. The demodulators 34 demodulate the electric signals and extract the data signals S1 to Sn with the frequencies f1 to fn and request signals REQi. The demodulators 34 are, for example, envelope detectors, square-law detectors, phase detectors or frequency detectors, while the detectors demodulate the data signals on the basis of a method for modulating the data signals S1 to Sn. The receiving device 3 may execute the reception process using optical direct detection, heterodyne detection or coherent detection.

The receiving device 3 executes the OE conversion on the optical carrier vc received through the transmission path and thereby receives the data signals S1 to Sn multiplexed by the multiplex transmitting devices 2(1) to 2($n$). As described above, the request signals REQi are multiplexed as signals with the fixed frequency f0 into the optical carrier vc (refer to a graph G4). The request signals REQi extracted by the demodulators 34 are output to the controller 40 of the management device 4.

The controller 40 manages assignment of the frequencies f1 to fn to the data signals S1 to Sn. As described above, the controller 40 receives, from the multiplex transmitting devices 2($i$), the request signals REQi that request the management device 4 to assign the frequencies. Then, the controller 40 uses response signals RES to notify the multiplex transmitting devices 2($i$) of the assigned frequencies. In addition, the controller 40 sets the central frequencies fi and the bandwidths BWi in the tunable band-pass filters 32. The controller 40 acquires the bandwidths BWi from the request signals REQi.

The controller 40 is, for example, a processing circuit such as a CPU and executes a process on the basis of a predetermined program. The controller 40 may not function using the software. The controller 40 may function using hardware such as an integrated circuit for specific use.

The storage unit 41 is a storage section such as a memory, for example. The storage unit 41 stores a program to be used to operate the controller 40, a management table 410 to be used to manage the assignment of the frequencies f0 to fn, and the like.

The controller 40 manages the central frequencies fi and bandwidths BWi of the data signals Si on the basis of intervals that are smaller than a wavelength interval used for WDM. This is due to the fact that while WDM is a wavelength division multiplexing technique for multiplexing signals with a predetermined frequency (so-called ITU-T grid) of 100 GHz, 50 GHz or the like, optical FDM is a technique for multiplexing signals into an optical carrier vc with a certain wavelength at frequency intervals of several MHz to several GHz.

The receiving device 3 causes the single PD 30 to execute the OE conversion on the optical carrier vc into which the data signals Si have been multiplexed and electrically processes the data signals on a signal basis. Thus, during the OE conversion, harmonic components may be generated in the data signals Si. The harmonic components of the data signals Si may cause crosstalk. As described above, since the controller 40 manages the central frequencies fi and bandwidths BWi of the data signals Si on the basis of the small intervals, the crosstalk is an important problem. It is preferable that the intervals between the central frequencies of the data signals Si be large in order to avoid the crosstalk. The larger the intervals, the smaller the number of data signals to be multiplexed. Thus, the relationship between the qualities of the signals and the number of the signals to be multiplexed is a trade-off relationship.

The controller 40 specifies a frequency band to be used on the basis of a modulation band of the optical modulators 200 before assignment of the frequencies in order to avoid the effect of the harmonics generated during the OE conversion executed by the PD 30. The modulation band of the optical modulators 200 is input as a setting signal CFG to the controller 40 from an external operating terminal (not illustrated), for example. The modulation band is common to the multiplex transmitting devices 2(1) to 2($n$). If the LD executes the direct modulation, an upper limit for the modulation band is approximately 10 GHz, for example. If the external modulation is used by the LN modulator or the like, the upper limit for the modulation band is several tens of GHz.

Figure 4:
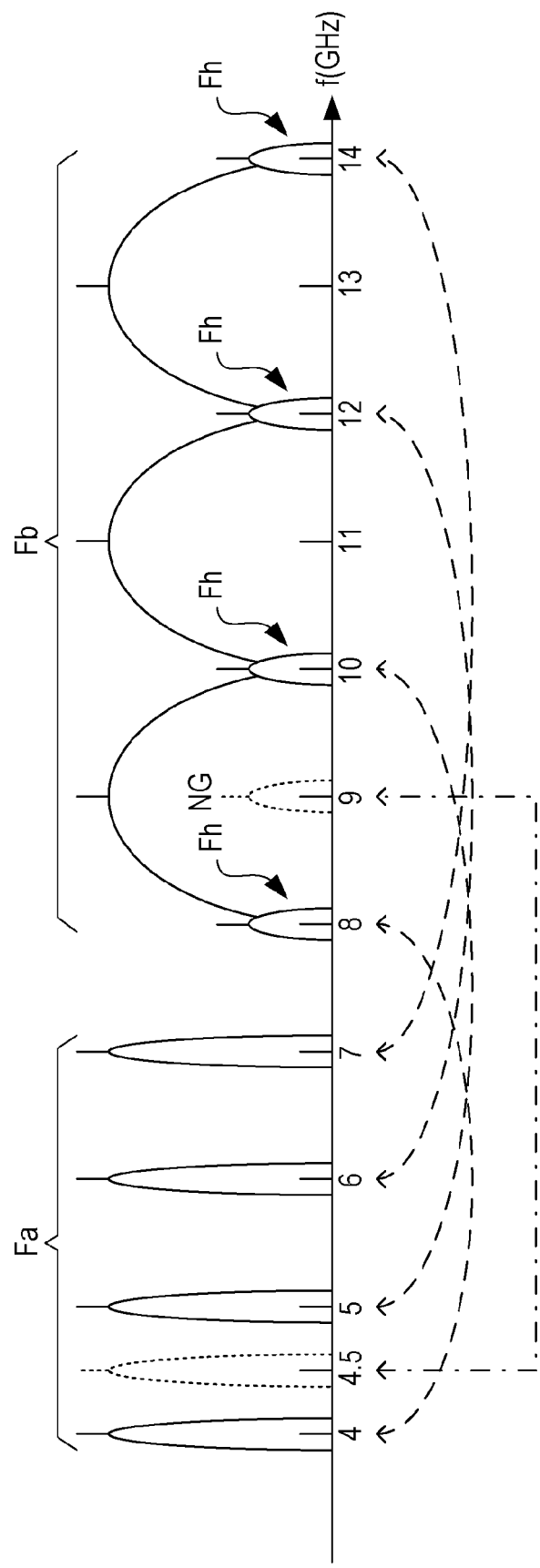
FIG. 4 is a spectrum distribution diagram of data signals, exemplifying an effect of second-order harmonics.

A method for specifying the frequency band that avoids the effect of the harmonics is described below. FIG. 4 is a diagram illustrating a spectrum distribution of the data signals and exemplifying an effect of second-order harmonics. In FIG. 4, four channels (i.e., data signals) that each have a bandwidth of 100 Mbps are assigned to a low-frequency band Fa, while three channels that each have a bandwidth of 1 Gbps are assigned to a high-frequency band Fb. Central frequencies of the signals of the low-frequency band Fa are 4 GHz, 5 GHz, 6 GHz and 7 GHz, while central frequencies of the signals of the high-frequency band Fb are 9 GHz, 11 GHz and 13 GHz.

When the signals are multiplexed using optical FDM, second-order harmonics Fh are generated from the signals of the low-frequency band Fa and have central frequencies of 8 GHz, 10 GHz, 12 GHz and 14 GHz (refer to dashed lines), which are twice as high as the central frequencies of the signals of the low-frequency band Fa. In this case, bands of the harmonics Fh overlap only parts of side lobes of the signals of the high-frequency band Fb. Thus, an effect of the harmonics Fh on the high-frequency band Fb does not substantially occur.

As indicated by dashed lines illustrated in FIG. 4, if a signal with a central frequency of 4.5 GHz is assigned, a harmonic with a central frequency of 9 GHz that is twice as high as the frequency of 4.5 GHz is generated (refer to an alternate long and short dashed line). The harmonic overlaps a main lobe of the signal with the central frequency of 9 GHz and degrades the quality of the signal (refer to "NG" illustrated in FIG. 4).

Figure 5:
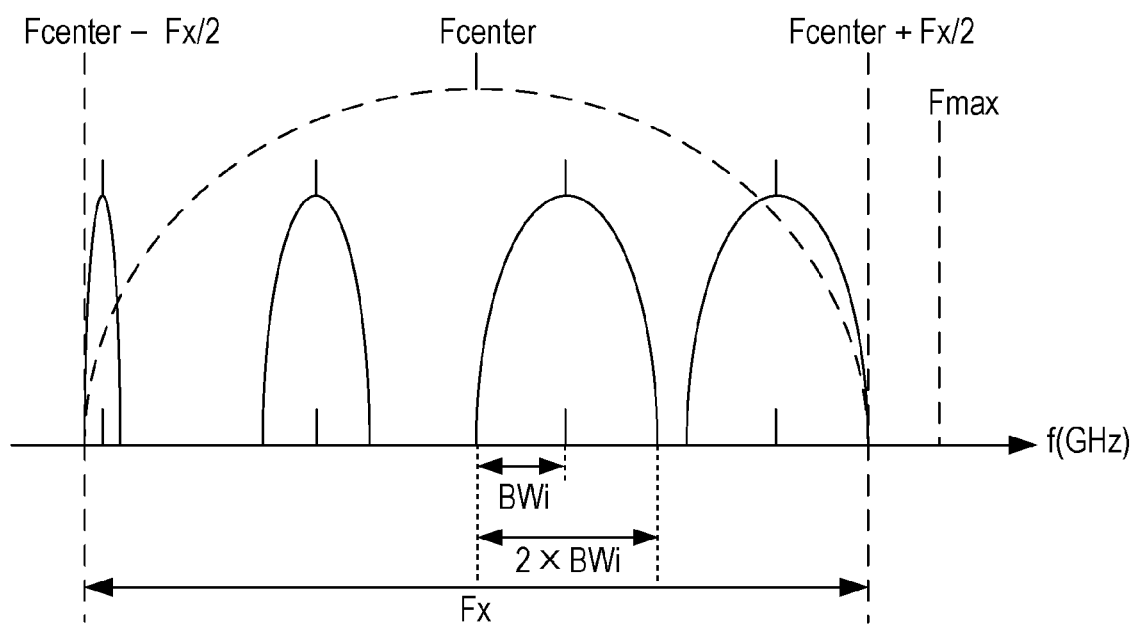
FIG. 5 is a spectrum distribution diagram illustrating a frequency band to be used.

The controller 40 of the management device 4 specifies, on the basis of the aforementioned principle, a frequency band that is used to multiplex the data signals Si and enables a larger number of data signals to be multiplexed in wider bands. FIG. 5 is a spectrum distribution diagram illustrating the frequency band to be used. In FIG. 5, Fmax indicates the modulation band specific to the modulators 200, Fx indicates the width of the frequency band to be used, and Fcenter indicates a central frequency of the frequency band. The following description with reference to FIG. 5 is intended for only a second-order harmonic.

The method for specifying the frequency band to be used is executed in accordance with the following two points. One of the points is that the central frequency of a data signal is not assigned within a band of which the width is twice as large as a bandwidth to be used for another data signal Si. For example, when a certain signal with a bandwidth of 100 MHz is assigned, the central frequency of another signal is not assigned within a band of ±100 MHz with respect to the central frequency of the certain signal. The other point is that a frequency that is twice as high as the central frequency of an assigned signal overlaps the frequency of a second-order harmonic component of the signal and is therefore not used, as described with reference to FIG. 4.

The following Formulas are obtained from the aforementioned two points.

$$Fx \leq Fmax/2 \quad \text{(Formula 1)}$$

$$2 \cdot (Fcenter - Fx/2) \geq 2 \cdot (Fcenter + Fx/2) \quad \text{(Formula 2)}$$

Thus, an ideal central frequency Fcenter is calculated as follows on the basis of the aforementioned Formulas 1 and 2.

$$Fcenter = (3/4) \cdot Fmax \quad \text{(Formula 3)}$$

For example, when the optical modulators 200 have a modulation band of 10 GHz, Fmax=10. Thus, Fcenter=7.5 GHz according to Formula 3. When the signals are assigned within a band with a width Fx of 3 GHz, the frequency band to be used is in a range of 7.5±1.5 GHz or in a range of 6 to 9 GHz. The frequency band to be used may be in a range of Fmax/2 to Fmax without using Formula 3. In this manner, in order to avoid an effect of the second-order harmonics, the management device 4 specifies the frequency band (to be used) that is higher than a central frequency (i.e., Fmax/2) of the modulation band Fmax of the optical modulators 200.

When three- or higher-order harmonic components are considered as well as the second-order harmonics, the following Formula is obtained in a similar manner to Formula 2.

$$N \cdot (Fcenter - Fx/2) \geq 2 \cdot (Fcenter + Fx/2) \quad \text{(Formula 4)}$$

In Formula 4, N=2, 3, . . . .

Thus, an ideal central frequency Fcenter is calculated as follows on the basis of Formula 4.

$$Fcenter \geq (N+1)/\{2 \cdot (N-1)\} \cdot Fx \quad \text{(Formula 5)}$$

For example, when the optical modulators 200 have the modulation band of 10 GHz and the signals are assigned within a band with a width Fx of 4 GHz, the frequency band to be used is in a range of 6.0±2.0 GHz or a range of 4 to 8 GHz according to Formula 5 in order to avoid an effect of the second-order harmonic components. In order to avoid an effect of third-order harmonic components, the frequency band to be used is set to a range of 4.0±2.0 GHz or a range of 2 to 6 GHz. In order to avoid an effect of fourth-order harmonic components, the frequency band to be used is set to a range of 3.33±2.0 GHz or a range of 1.33 to 5.33 GHz. In order to avoid both effect of the second-order harmonic components and effect of the third-order harmonic components, the frequency band to be used is set to a range of 4 to 6 GHz, which is common to the range of 4 to 8 GHz and the range of 2 to 6 GHz. For other order harmonic components, the frequency band to be used is obtained using the same method.

Figure 6:
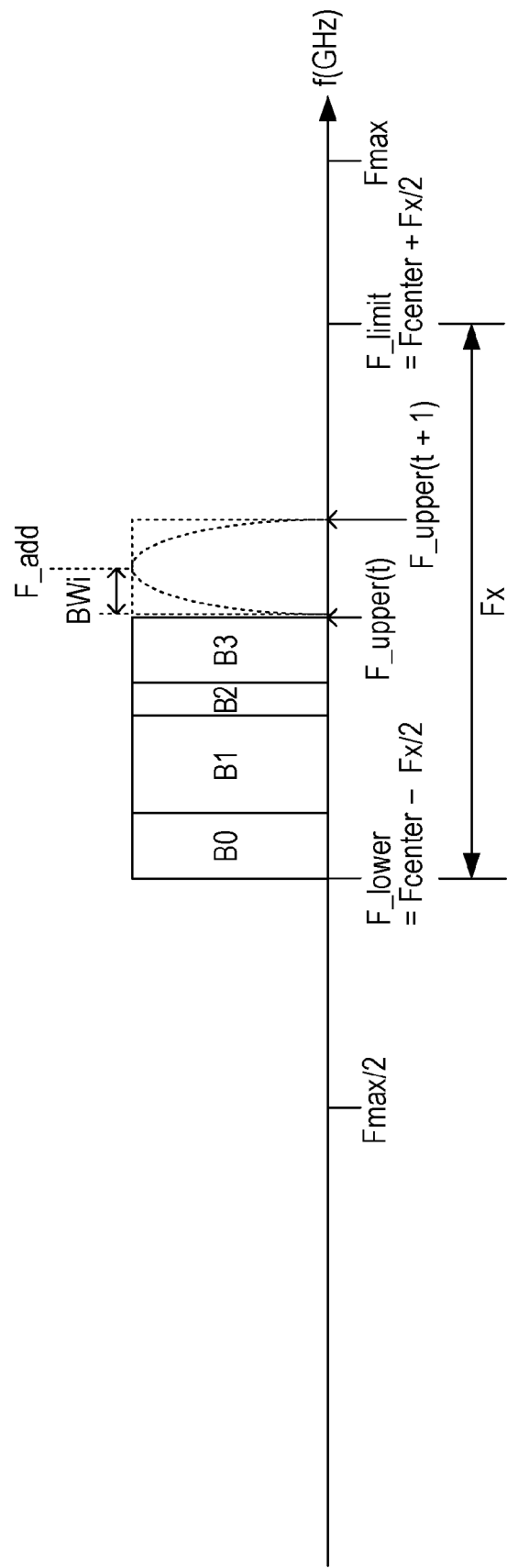
FIG. 6 is a band distribution diagram illustrating assignment of the frequency band.

The controller 40 of the management device 4 manages the assignment of the frequencies (central frequencies) fi of the data signals within the frequency band specified by the aforementioned method and to be used. FIG. 6 is a band distribution diagram illustrating assignment of the frequency band. FIG. 6 assumes that a band B0 is assigned to a request signal REQi, and bands B1 to B3 are assigned to the data signals S1 to S3, respectively. The frequency band (refer to "Fx") to be used is set within a band in a range from Fmax/2 to Fmax in order to avoid an effect of second-order harmonics.

The controller 40 of the management device 4 sequentially assigns frequencies in order from a lower limit F_lower for the frequency band to be used in order to avoid the presence of an unused band between the bands B1 and B2 to be used for the data signals S1 and S2 and between the bands B2 and B3 to be used for the data signals S2 and S3. The lower limit F_lower is a frequency of (Fcenter−Fx/2) as described above.

The controller 40 calculates an upper limit F_upper(t) for all the assigned bands B0 to B3 so that a lower limit for a band to be used for a data signal Si to be newly multiplexed is equal to the upper limit for the bands B0 to B3 that are currently used. The controller 40 assigns the frequencies using the upper limit F_upper(t) as a standard. Specifically, the controller 40 determines frequencies F_add (central frequencies) to be assigned to the data signals Si on the basis of the upper limit F_upper(t) for all the assigned bands B0 to B3 and a bandwidth BWi occupied by the data signal to be newly multiplexed. In this case, the following Formula 6 is established.

$$F\_add = F\_upper + BWi + \alpha \quad \text{(Formula 6)}$$

In Formula 6, α indicates an interval between the bandwidth BWi and the adjacent band B3. Information of the bandwidth BWi is included in the request signal REQi.

Then, an upper limit for the band to be used for the newly multiplexed data signal Si or an upper limit F_upper limit(t+1) after the assignment is calculated according to the following Formula 7.

$$F\_upper(t+1) = F\_upper(t) + 2 \cdot (BWi + \alpha) \quad \text{(Formula 7)}$$

Since a band is not assigned within a band that is not included in the frequency band to be used, the following Formula 8 is established.

$$F\_upper(t+1) \leq F\_limit \quad \text{(Formula 8)}$$

In Formula 8, a limit F_limit is an upper limit for the frequency band to be used and is equal to a value of (Fcenter+ Fx/2).

When receiving the request signal REQi, the controller 40 causes the frequency F_add calculated according to Formula 6 to be included in a response signal RES as a frequency to be assigned and transmits the response signal RES to the multiplex transmitting device 2(i). Then, the controller 40 calculates a new upper limit F_upper(t+1) according to Formula 7.

The controller 40 uses the upper limit F_upper(t) for the assigned bands as a pointer in order to assign a frequency fi to the data signal Si to be newly multiplexed and calculates the frequency F_add to be assigned according to Formula 6. In addition, the controller 40 calculates a new upper limit F_upper(t+1) according to Formula 7 for the next assignment. Thus, the management device 4 efficiently executes the assignment process in a simple manner.

Figure 7:
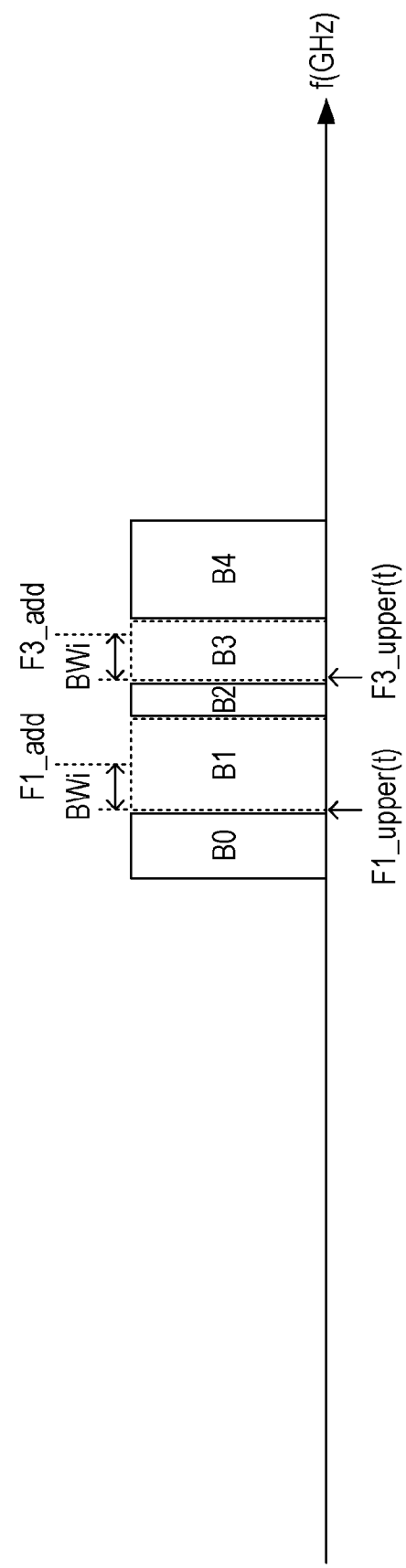
FIG. 7 is a diagram illustrating a distribution of bands including unused frequency bands.

In order to achieve the efficient assignment process, the management device 4 may reassign a frequency within an unused band. FIG. 7 is a band distribution diagram illustrating a band including unused frequency bands. FIG. 7 illustrates an example in which the bands B1 and B3 (refer to dashed lines) illustrated in FIG. 6 are not used.

In order to stop the multiplexing of the data signal Si, the multiplex transmitting device 2(i) transmits a request signal REQi that requests the stop. In this example, request signals REQi that request the stop of the assignment of the bands are transmitted from the multiplex transmitting devices 2(1) and 2(3), and the controller 40 stops the assignment of the bands B1 and B3 in response to the request signals REQi. Thus, the two unused bands B1 and B3 between which an interval exists are present in the frequency band to be used. The controller 40 manages the unused bands B1 and B3 and the other assigned bands using the management table 410 and assigns the bands to data signals Si to be newly multiplexed.

FIG. 8 illustrates an example of the management table 410. Management numbers, node IDs, bandwidths, occupied bandwidths, central frequencies and usage states are associated with each other and stored in the management table 410.

The management numbers are provided by the controller 40 in order to identify data included in the management table 410. For example, the management numbers are chronologically provided. The node IDs indicate information of the identifications of multiplex transmitting devices 2 that transmit data signals Si to which frequencies have been assigned. For unused bands, node IDs are not stored (refer to "–").

Each of the bandwidths indicates a bandwidth BWi occupied by a data signal Si or an unused bandwidth. The occupied bandwidths are obtained by doubling the corresponding bandwidths, respectively. If the aforementioned interval a is set, the occupied bandwidths are values obtained by adding a value of (2×α) to widths obtained by doubling the bandwidths. The usage states indicate that the bands are being used or not used. Specifically, the usage states are usage information that indicates that if an interested band is already assigned, the band is being used, and if the interested band has been requested for the stop of assignment by a request signal REQi, the band is not used.

In this manner, the management device 4 has the management table 410 in which the bandwidths, the usage information and the frequencies assigned to the data signals Si are stored for the multiplex transmitting devices 2(1) to 2(n). If any of the multiplex transmitting devices 2(1) to 2(n) stops multiplexing a data signal Si, the management device 4 updates usage information corresponding to the multiplex transmitting device 2(i) to an unused state. Thus, the management device 4 may manage the frequency assignment in a simple manner and easily reassign a frequency within an unused band.

Figure 9:
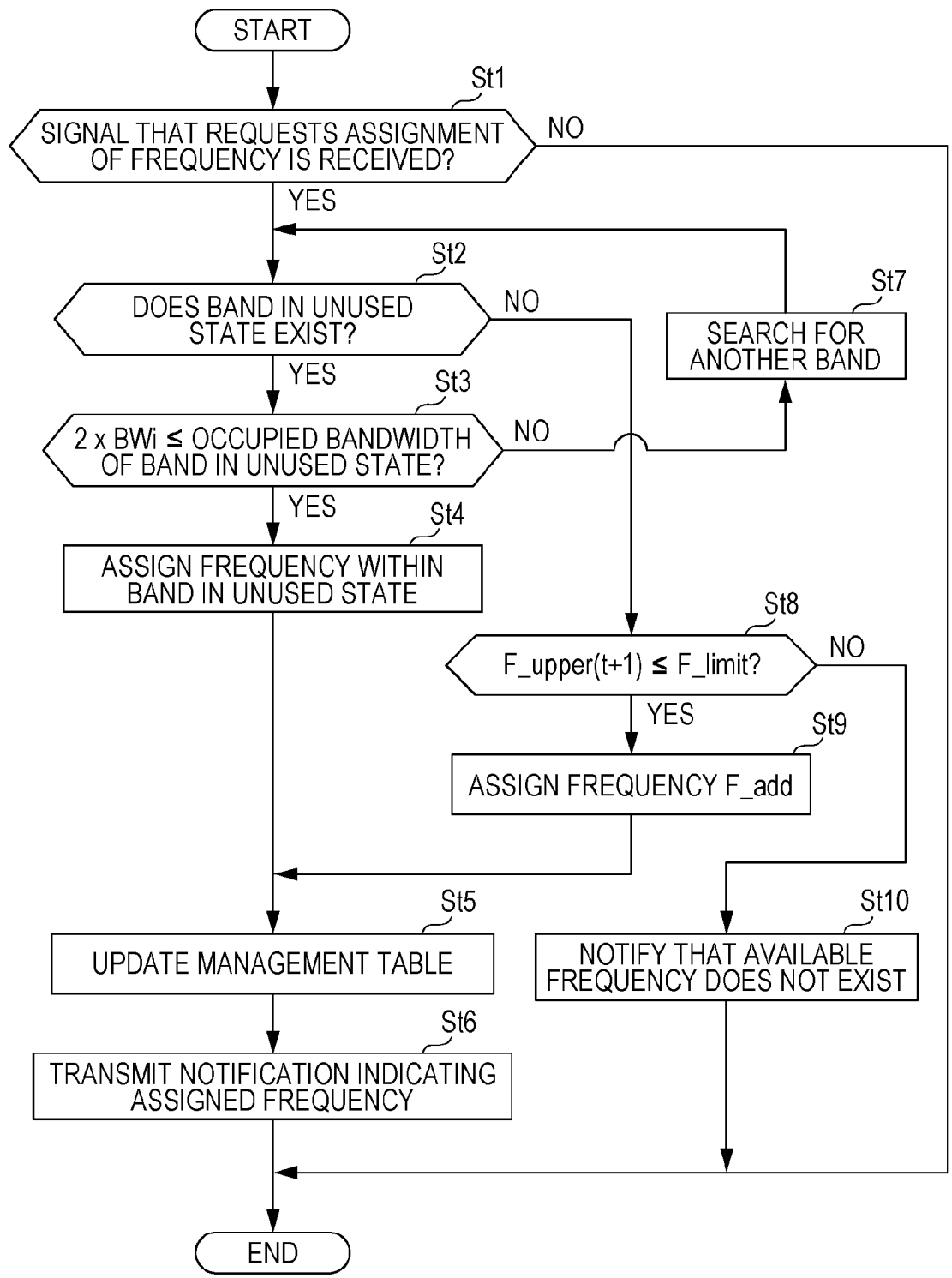
FIG. 9 is a flowchart of operations that are executed by a management device in an assignment process.

FIG. 9 is a flowchart of operations that are executed in the assignment process by the management device 4. When receiving a request signal REQi that requests assignment of a frequency from a multiplex transmitting device 2(i) (Yes in operation St1), the controller 40 confirms whether or not a band in the unused state exists (in operation St2). In operation St2, the controller 40 references the management table 410 and searches for a band of which a usage state indicates the unused state. If the controller 40 does not receive the request signal REQi (No in operation St1), the controller 40 terminates the process.

If the band in the unused state exists (Yes in operation St2), the controller 40 determines whether or not a value of (2×BWi) is equal to or smaller than an occupied bandwidth of the band in the unused state (in operation St3). In operation St3, the controller 40 references the management table 410, acquires the occupied bandwidth of the band in the unused state, and compares the acquired occupied bandwidth with the value of (2×BWi).

If the value of (2×BWi) is equal to or smaller than the occupied bandwidth of the band in the unused state as a result of the comparison (Yes in operation St3), the controller 40 assigns a frequency within the band in the unused state to a corresponding data signal Si (in operation St4). A method for the assignment is the same as or similar to the method described with reference to FIG. 6. Specifically, the controller 40 calculates an upper limit Fi_upper(t) for each of bands in the unused state and determines, on the basis of the upper limits Fi_upper(t), frequencies Fi_add to be assigned to data signals Si to be newly multiplexed (refer to FIG. 7).

If the value of (2×BWi) is larger than the occupied bandwidth of the band in the unused state (No in operation St3), the controller 40 references the management table 410, searches for another band in the unused state (in operation St7), and executes the process in order from operation St2 again.

After the assignment of the frequency, the controller 40 updates the management table 410 (in operation St5). In operation St5, the controller 40 registers the assigned frequency fi, the bandwidth BWi and the like in the management table 410. If the band in the unused state has an available band, or if a value obtained by subtracting the value of (2×BWi) from the occupied bandwidth of the band in the unused state is larger than 0, the controller 40 registers the available band in the management table 410 as a new band in the unused state.

Next, the controller 40 transmits a notification indicating the assigned frequency fi to the multiplex transmitting device 2(i) that has transmitted the request signal REQi (in operation St6). The notification is transmitted as a response signal RES. After the notification is transmitted, the controller 40 terminates the process. Operation St6 may be executed before operation St5.

If the band in the unused state does not exist in the management table 410 (in operation St2), the controller 40 determines whether or not F_upper(t+1)≤F_limit (in operation St8). The upper limit F_upper(t+1) is calculated according to the aforementioned Formula 7. The limit F_limit is the upper limit for the frequency band to be used and is equal to the value of (Fcenter+Fx/2), as described above.

If F_upper(t+1)≤F_limit (Yes in operation St8), the controller calculates a frequency F_add according to the aforementioned Formula 6 and assigns the frequency F_add to the data signal Si (in operation St9). After the assignment is completed, the controller 40 updates the management table 410 (in operation St5) and transmits a notification indicating the assigned frequency F_add(fi) to the multiplex transmitting device 2(i) (in operation St6).

If F_upper(t+1)>F_limit (No in operation St8), the controller 40 determines that an available frequency does not exist and the controller 40 uses the response signal RES to notify the multiplex transmitting device 2(i) that an available frequency does not exist (in operation St10). After the notification, the controller 40 terminates the process.

If the management device 4 determines, on the basis of the usage information stored in the management table 410, that a band in the unused state exists within the frequency band to be used, the management device 4 assigns a frequency fi within the band in the unused state to a data signal Si to be newly multiplexed. When the assigned band becomes the unused state, the management device 4 may reassign a frequency within the interested band and efficiently use a resource of the limited band.

The method for assigning a band uses an upper limit F_upper(t) for an assigned band as a standard. The method, however, may use a lower limit for the assigned band as the standard. In this case, the management device 4 sequentially assigns frequencies in order from the upper limit for the frequency band to be used, i.e., a frequency of (Fcenter+Fx/2) and calculates a lower limit for all assigned bands as a pointer. Thus, the management device 4 determines a frequency to be assigned to a data signal to be newly multiplexed on the basis of the lower limit for all the assigned bands within the frequency band to be used and a bandwidth BWi occupied by the data signal to be newly multiplexed. In this case, a limit F_limit for the assignment is the lower limit for the frequency band to be used, i.e., the frequency of (Fcenter−Fx/2). Even in this case, the assignment process is efficiently executed in the same manner as the aforementioned details of the process.

In the first embodiment, the multiplex transmitting devices 2(1) to 2(n) multiplex request signals REQi into the optical carrier vc when starting the multiplexing of the data signals Si, while the request signals REQi have the predetermined frequency f0 in the frequency band to be used. Thus, the multiplex transmitting devices 2(1) to 2(n) transmit the request signals REQi while using a frequency band within the frequency band to be used. Then, the management device 4 assigns frequencies to the data signals Si on the basis of the request signals REQi received through the receiving device 3. The request signals REQi may be transmitted and received in the same manner as the method for transmitting and receiving the data signals Si. Thus, a simple, low-cost control system is achieved without using another special transmitter and receiver. The devices for transmitting the request signals REQi are not limited to the multiplex transmitting devices 2(1) to 2(n).

Second Embodiment

Figure 10:
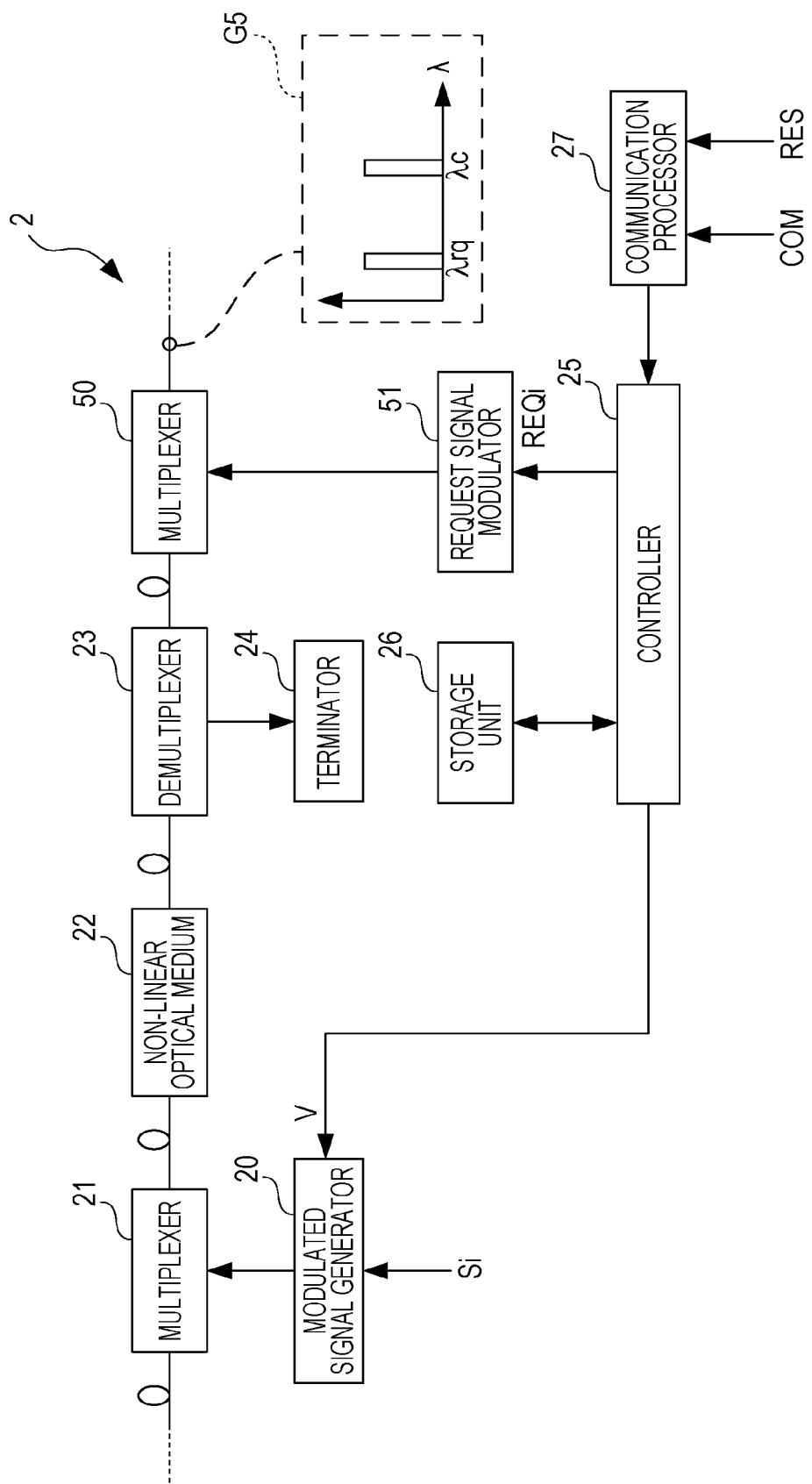
FIG. 10 is a diagram illustrating the configuration of a multiplex transmitting device according to the second embodiment.

FIG. 10 is a diagram illustrating the configuration of each of multiplex transmitting devices 2 according to the second embodiment. In FIG. 10, configurations that are the same as those described in the first embodiment are indicated by the same reference numerals and symbols as those described in the first embodiment, and a description thereof is omitted. In the second embodiment, the request signals REQi have a different wavelength $\lambda rq$ from a wavelength $\lambda c$ of the optical carrier vc and are transmitted (refer to a graph G5).

The multiplex transmitting devices 2 according to the second embodiment each include the modulated signal generator 20, the multiplexer 21, the non-linear optical medium 22, the demultiplexer 23, the terminator 24, the controller 25, the storage unit 26, the communication processor 27, a multiplexer 50 and a request signal modulator 51. The controller 25 outputs a request signal REQi to the request signal modulator 51. The request signal modulator 51 includes an optical modulator and an optical source that outputs an optical signal with the wavelength $\lambda rq$. The request signal modulator 51 modulates the request signal REQi into an optical signal with the wavelength $\lambda rq$. The optical signal is input to the transmission path through the multiplexer 50 that is a WDM coupler or the like.

Figure 11:
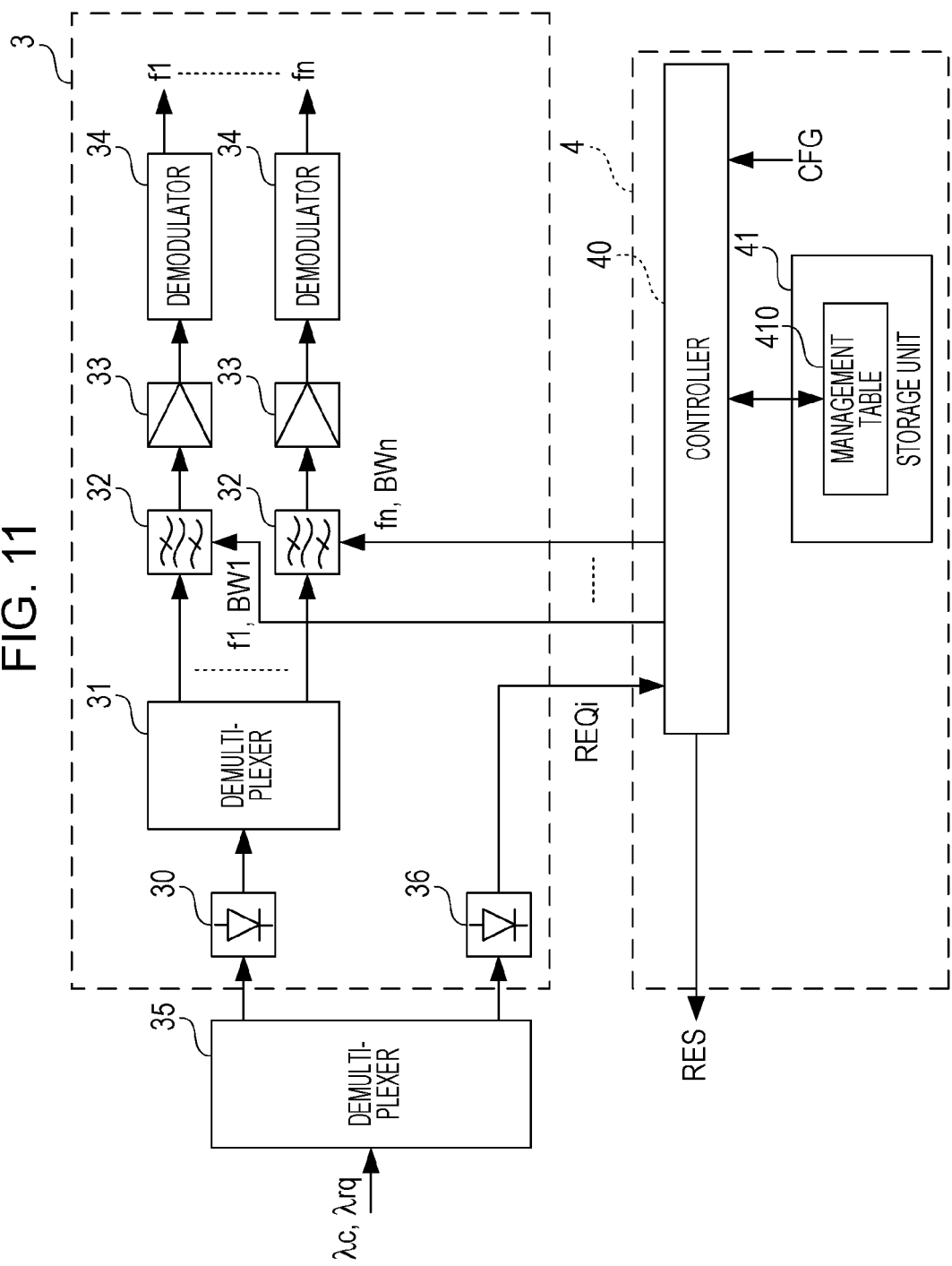
FIG. 11 is a diagram illustrating the configuration of a receiving node according to the second embodiment.

FIG. 11 is a diagram illustrating the configuration of a receiving node N according to the second embodiment. In FIG. 11, configurations that are the same as those described in the first embodiment are indicated by the same reference numerals and symbols as those described in the first embodiment, and a description thereof is omitted.

The receiving device 3 according to the second embodiment includes a demultiplexer 35, the PD 30, a PD 36, the demultiplexer 31 and a plurality of groups of tunable band-pass filters 32, amplifiers 33 and demodulators 34. The demultiplexer 35 receives the optical carrier vc (with the wavelength $\lambda rq$) and request signals REQi through the transmission path, modulates the optical carrier vc (with the wavelength $\lambda c$) and the request signals REQi into the optical signal with the wavelength $\lambda rq$, demultiplexes the optical signal with the wavelength $\lambda rq$, and transmits the optical signal to the PDs 30 and 36. The PD 36 executes OE conversion on the optical signal with the wavelength $\lambda rq$ so as to obtain the request signals REQi and outputs the request signals REQi to the controller 40.

In the present embodiment, the multiplex transmitting devices 2(1) to 2(n) transmit the request signals REQi to the receiving device 3 through the transmission path when starting the multiplexing of the data signals Si, while the request signals REQi have a different wavelength from the optical carrier vc. Then, the management device 4 assigns frequencies fi to the data signals Si on the basis of the request signals REQi received through the receiving device 3. The optical carrier vc and the request signals REQi are processed independently of each other. Thus, even if the optical carrier source 10 fails, the request signals REQi may be transmitted. The reliability of communication, therefore, is improved.

In the first and second embodiments, the management device 4 transmits response signals RES to the multiplex transmitting devices 2(i) through the communication network NW that is different from the transmission path for the optical carrier vc. The management device 4, however, is not limited to this.

Third Embodiment

Figure 12:
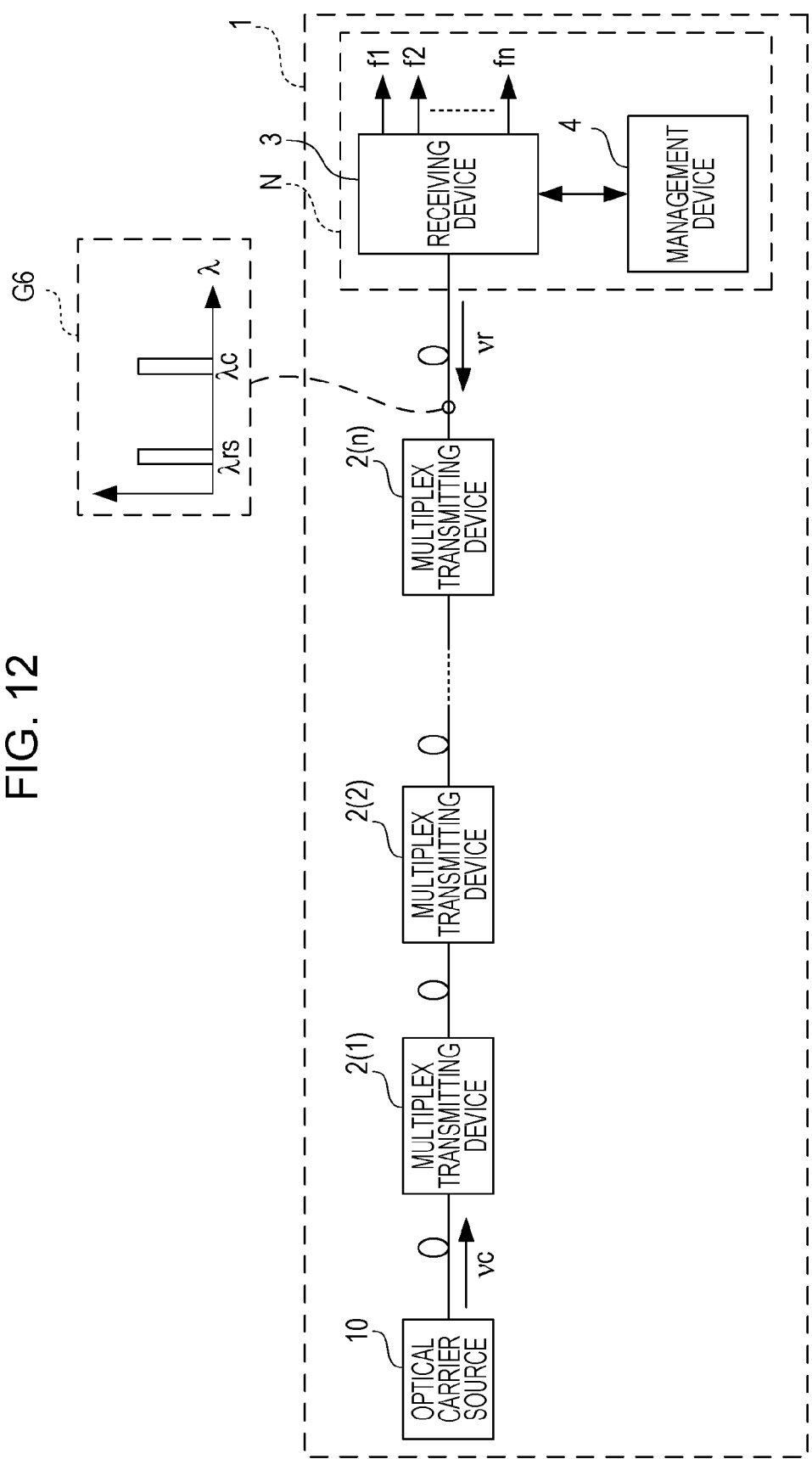
FIG. 12 is a diagram illustrating the configuration of an optical transmission system according to the third embodiment.

FIG. 12 is a diagram illustrating the configuration of an optical transmission system 1 according to the third embodiment. In the present embodiment, the response signals RES have a different wavelength $\lambda rs$ from the wavelength $\lambda c$ of the optical carrier vc and are transmitted through the transmission path for the optical carrier vc (refer to a graph G6).

Figure 13:
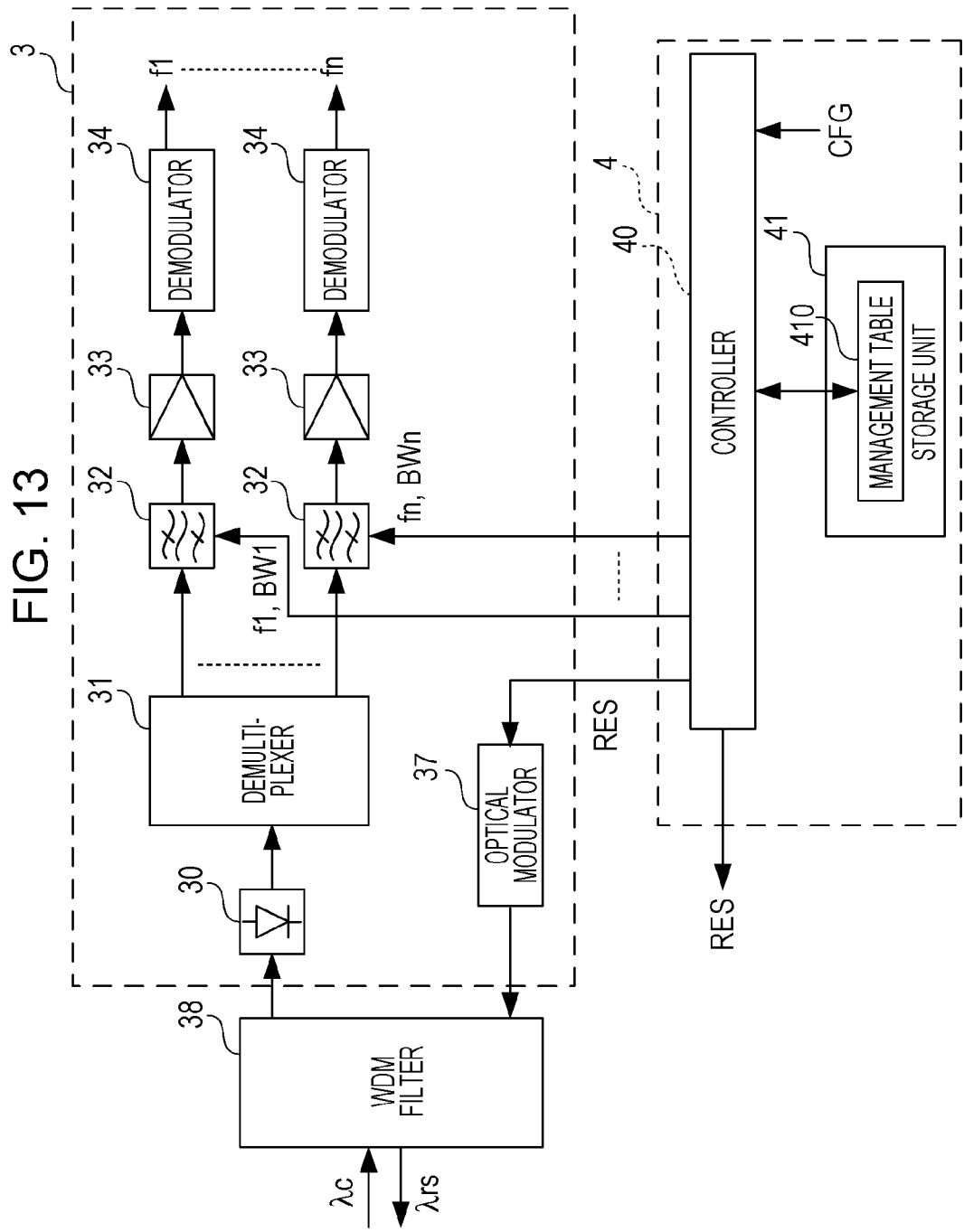
FIG. 13 is a diagram illustrating the configuration of a receiving node according to the third embodiment.

FIG. 13 is a diagram illustrating the configuration of a receiving node N according to the third embodiment. In FIG. 3, configurations that are the same as those described in the first embodiment are indicated by the same reference numerals and symbols as those described in the first embodiment, and a description thereof is omitted.

The receiving device 3 according to the third embodiment includes a WDM filter 38, the PD 30, the demultiplexer 31, an optical modulator 37 and a plurality of groups of tunable band-pass filters 32, amplifiers 33 and demodulators 34. The optical modulator 37 is an LD, for example. The optical modulator 37 modulates response signals RES received from the controller 40 into optical signals with the wavelength λrs and outputs the optical signals to the WDM filter 38. The optical modulator 37 may be an LN modulator and execute external modulation on the response signals RES.

The WDM filter 38 is a device that causes optical signals with different wavelengths to propagate in transmission paths in different directions, while the transmission paths are provided for the wavelengths λc and λrs, respectively. The WDM filter 38 causes the optical carrier vc (with the wavelength λc) received from the transmission path for the wavelength λc to be introduced in the PD 30 and causes the optical signal received from the optical modulator 37 and having the wavelength λrs to be introduced in the other transmission path for the wavelength λrs.

Figure 14:
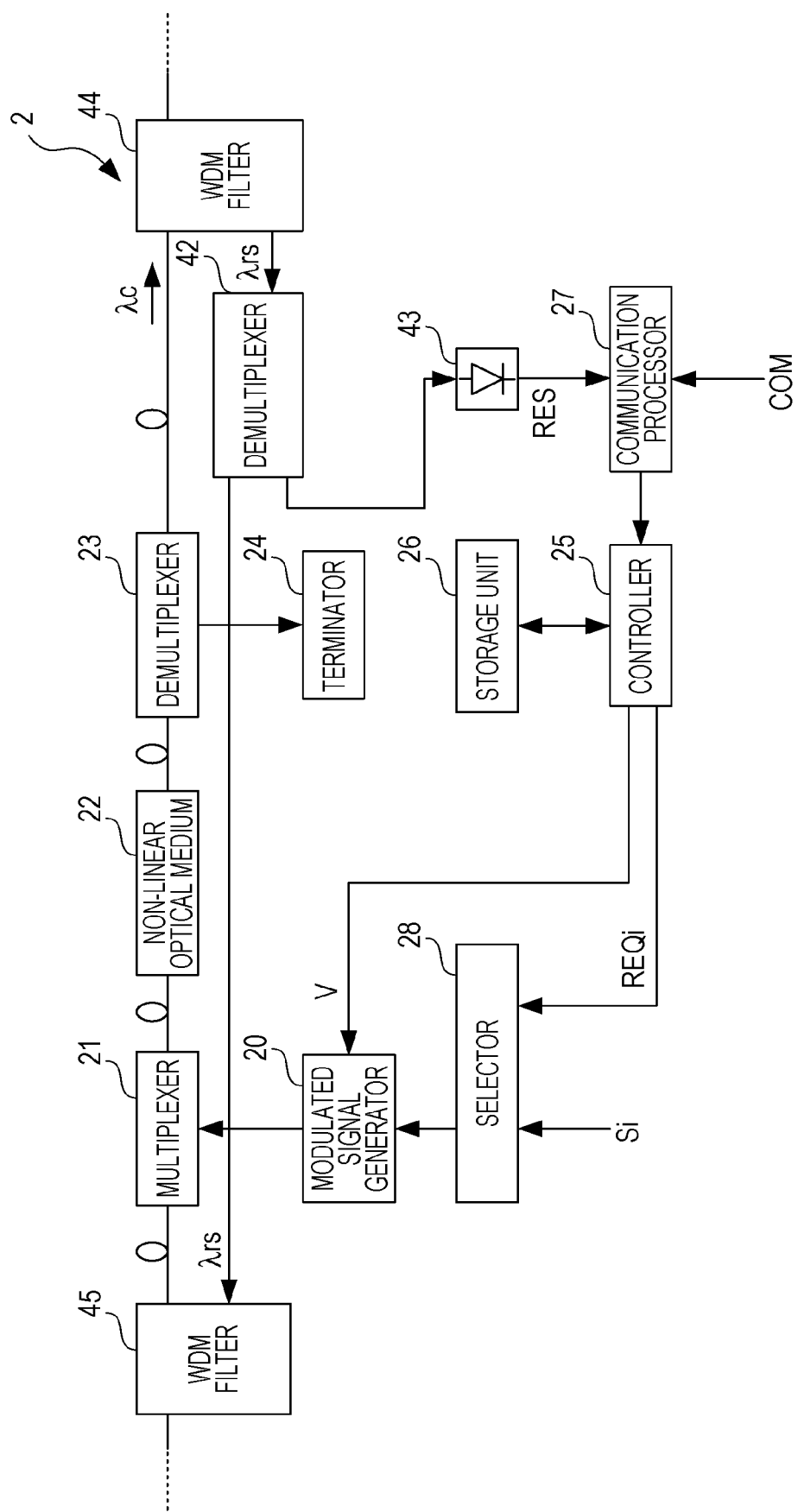
FIG. 14 is a diagram illustrating the configuration of a multiplex transmitting device according to the third embodiment.

FIG. 14 is a diagram illustrating the configuration of each of multiplex transmitting devices 2 according to the third embodiment. In FIG. 14, configurations that are the same as those described in the first embodiment are indicated by the same reference numerals and symbols as those described in the first embodiment, and a description thereof is omitted.

The multiplex transmitting devices 2 each include the modulated signal generator 20, the multiplexer 21, the non-linear optical medium 22, the demultiplexer 23, a demultiplexer 42, the terminator 24, the controller 25, the storage unit 26, the communication processor 27, the selector 28, WDM filters 44 and 45 and a PD 43. The WDM filters 44 and 45 are the same as or similar to the WDM filter 38.

The WDM filter 44 causes the optical signal received from the receiving device 3 through the transmission path for the wavelength λrs and having the wavelength λrs to be introduced in the demultiplexer 42 and causes the optical carrier vc received from the demultiplexer 23 and having the wavelength λc to be introduced in the transmission path for the wavelength λc. The demultiplexer 42 is an optical coupler, for example. The demultiplexer 42 demultiplexes the optical signal with the wavelength λrs and transmits the demultiplexed optical signal to the WDM filter 45 and the PD 43. The PD 43 executes OE conversion on the optical signal with the wavelength λrs so as to obtain the response signals RES and outputs the response signals RES to the communication processor 27.

The WDM filter 45 causes the optical carrier vc with the wavelength λc to be introduced in the transmission path for the wavelength λc and causes the optical signal with the wavelength λrs to be introduced in the transmission path for the wavelength λrs so as to enable the optical signal to be received by the adjacent multiplex transmitting device 2(i−1). Thus, the response signals RES are received by all the multiplex transmitting devices 2(1) to 2(n) that are connected to the receiving device 3 through the transmission paths. The response signals RES include destination information that identifies destinations that are the multiplex transmitting devices 2(1) to 2(n). Thus, each of the multiplex transmitting devices 2(1) to 2(n) references the destination information and processes only a response signal RES of which the destination is the multiplex transmitting device 2. In the present embodiment, a device that has an optical directional coupler such as an optical circulator may be used instead of the WDM filters 44 and 45.

In the present embodiment, in order to assign frequencies fi to data signals Si, the management device 4 transmits response signals (control signals) RES with the different wavelength λrs from the wavelength λc of the optical carrier vc to the plurality of multiplex transmitting devices 2(1) to 2(n) through the transmission path that is common to the optical carrier vc with the wavelength λc and the response signals RES. Thus, the management device 4 according to the present embodiment receives the request signals REQi and transmits the response signals RES through the single transmission path without using the communication network NW, unlike the first and second embodiments. Thus, a low-cost control system is achieved.

In the first to third embodiments, the management device 4 determines a frequency fi to be assigned on the basis of a bandwidth BWi included in a request signal REQi. The management device 4, however, is not limited to this. For example, the management table 410 may be shared by the management device 4 and the multiplex transmitting devices 2(i). The multiplex transmitting devices 2(i) may determine frequencies fi on the basis of the management table 410, cause information of the frequencies fi to be included in the request signals REQi, and transmit the request signals REQi to the management device 4. In this case, the management device 4 may transmit the management table 410 to the multiplex transmitting devices 2(i) at regular intervals or upon an update of the management table 410, and the multiplex transmitting devices 2(i) may store the management table 410 in the storage units 26.

The receiving device 3 uses the tunable band-pass filter 32 to extract the data signals Si. The receiving device 3, however, is not limited to this. For example, the receiving device 3 may have a plurality of band-pass filters that cause signals with different frequencies in different bands to pass through the band-pass filters. The receiving device 3 may individually select, from among the plurality of band-pass filters, filters corresponding to assigned frequencies and bands and extract the data signals Si.

The embodiments are described above. It is, however, obvious that those skilled in the art may come up with various modifications on the basis of the basic technical idea and instructions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
a plurality of multiplex transmitting devices, each configured to modulate, with an optical carrier, a data signal modulated into light by an optical modulator in a non-linear optical medium arranged on a transmission path through which the optical carrier is transmitted so as to multiplex the data signal into the optical carrier, the data signal having a frequency different in each of the plurality of multiplex transmitting devices;
a receiving device configured to execute optical-to-electrical conversion on the optical carrier received from the transmission path so as to execute reception process of the data signals multiplexed by the plurality of multiplex transmitting devices; and
a management device configured to specify a frequency band to be used, based on a modulation band that is common to all of the optical modulators, and manage assignment of the frequency of each of the data signals within the frequency band to be used such that a central frequency of a data signal is not assigned within a band of which a width is twice as large as a bandwidth to be used for another data signal and a frequency that is twice as high as the central frequency of an assigned signal is not used.

2. The optical transmission system according to claim 1, wherein the management device assigns the frequency in order from an upper or lower limit for the frequency band to be used.

3. The optical transmission system according to claim 2, wherein the management device determines a frequency to be assigned to a data signal to be newly multiplexed, based on an upper or lower limit for all assigned bands within the frequency band to be used and a bandwidth occupied by the data signal to be newly multiplexed.

4. The optical transmission system according to claim 3, wherein
the management device has a management table in which the frequencies assigned to the data signals, bandwidths and usage information are stored for each of the plurality of multiplex transmitting devices, and
when any of the plurality of multiplex transmitting devices stops multiplexing a data signal, the management device updates, to an unused state, usage information corresponding to the multiplex transmitting device that stops multiplexing the data signal.

5. The optical transmission system according to claim 4, wherein
if the management device determines, based on the usage information, that a band in an unused state exists in the frequency band to be used, the management device assigns a frequency within the band in the unused state to the data signal to be newly multiplexed.

6. The optical transmission system according to claim 1, wherein
each of the plurality of multiplex transmitting devices multiplexes a request signal with a frequency in the frequency band to be used into the optical carrier when starting the multiplexing of the data signal, and
the management device assigns frequency to each of the data signals, based on each of the request signals received through the receiving device.

7. The optical transmission system according to claim 1, wherein
each of the multiplex transmitting devices transmits request signal with a different wavelength from the optical carrier to the receiving device through the transmission path when starting the multiplexing of the data signal, and
the management device assigns frequency to each of the data signals, based on each of the request signals received through the receiving device.

8. The optical transmission system according to claim 1, wherein the management device transmits each of response signals with a different wavelength from the optical carrier to each of the plurality of multiplex transmitting devices through the transmission path upon the assignment of the frequency to the data signal.

9. The optical transmission system according to claim 1, wherein the management device specifies a frequency band that is to be used and is within a band that is higher than a central frequency of the modulation band of each of the optical modulators.

10. An optical transmission system comprising:
a plurality of multiplex transmitting devices, each configured to modulate, with an optical carrier, a data signal modulated into light by an optical modulator in a non-linear optical medium arranged on a transmission path through which the optical carrier is transmitted so as to multiplex the data signal into the optical carrier, the data signal having a frequency different in each of the plurality of multiplex transmitting devices;
a receiving device configured to execute optical-to-electrical conversion on the optical carrier received from the transmission path so as to execute reception process of the data signals multiplexed by the plurality of multiplex transmitting devices; and
a management device configured to specify a frequency band to be used, based on a modulation band that is common to all of the optical modulators, and manage assignment of the frequency of each of the data signals within the frequency band to be used, wherein assignment of the frequency of each of the data signals meets the following requirements, $N \cdot (Fcenter - Fx/2) \geq 2 \cdot (Fcenter + Fx/2)$; and $Fcenter \geq (N+1)/\{2 \cdot (N-1)\} \cdot Fx$, and wherein Fmax is the modulation band common to all of the optical modulators, Fx is a width of the frequency band to be used, Fcenter is a central frequency of the frequency band, and N in an integer greater than or equal to 2.

* * * * *